Patented Oct. 30, 1951

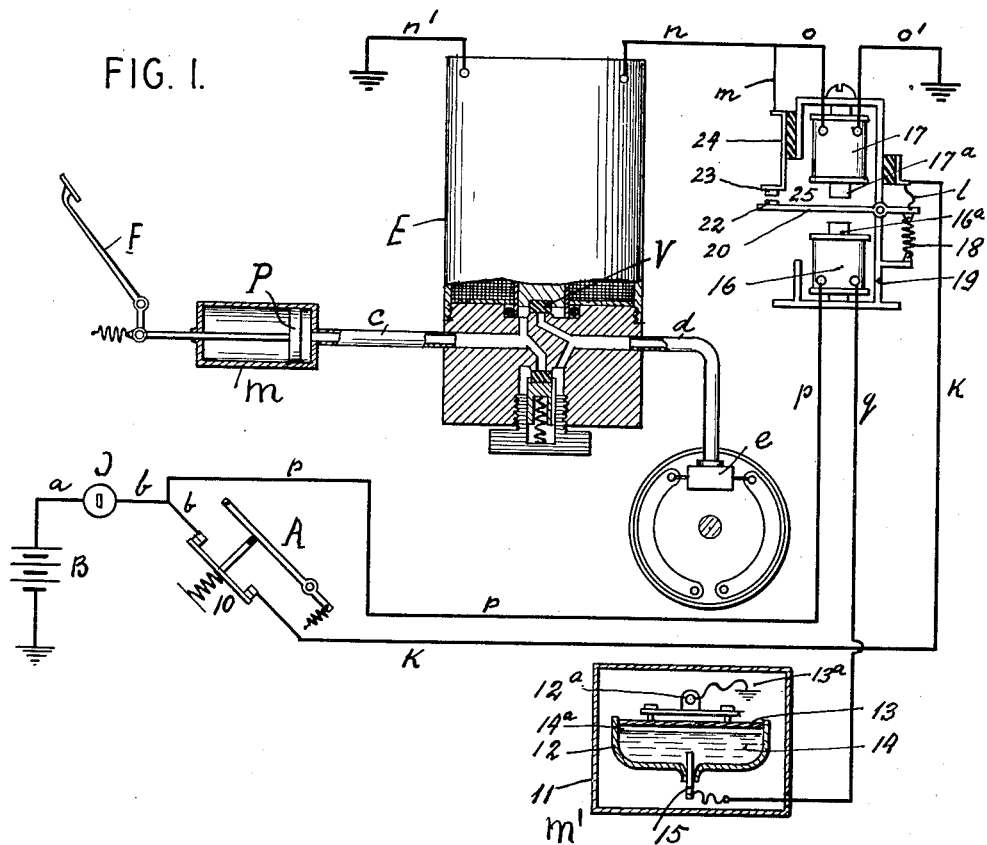
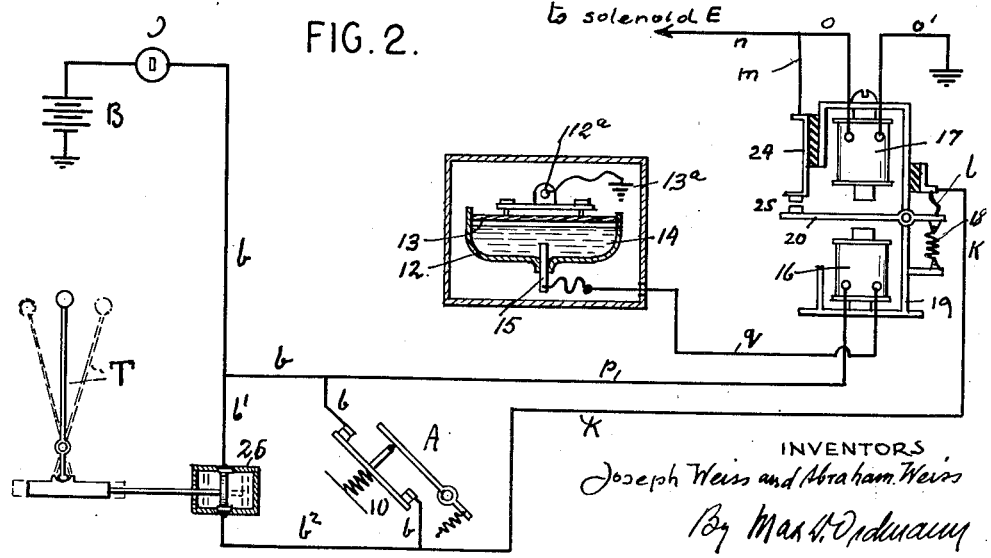

2,572,962

UNITED STATES PATENT OFFICE 2,572,962

BRAKE CONTROL SYSTEM FOR MOTOR VEHICLES

Joseph Weiss and Abraham Weiss, New York, N. Y.; Joseph Weiss, administrator of said Abraham Weiss, deceased, assignor to Joseph Weiss individually Original application December 11, 1946, Serial No. 715,580. Divided and this application April 13, 1948, Serial No. 20,714

7 Claims. (Cl. 192—3)

This application is a divisional application from the patent application Serial #715,580, filed December 11, 1946 and the invention relates to motor vehicles, specifically to a brake control system.

Its main object is to provide effective means whereby the tendency of the vehicle to roll back or forward upon the release of the brake pedal and before the accelerator is depressed will be eliminated.

Another object is to provide effective means whereby the brakes will be automatically locked in braking position when the vehicle comes to a full stop, while the ignition is on and the accelerator pedal released, and be automatically released when the accelerator pedal is depressed.

Another object is to provide means whereby the brakes will be retained in locked position when the engine has stalled and the accelerator is released.

Still another object is to provide means for preventing the accidental release of the brakes when the vehicle, through a push or from some other cause, is moved from its rest position.

Still another object is to provide an electric circuit automatically controlled by a switch responsive to vibration.

With these and other objects in view, that will be apparent from the detailed description of our invention, the latter consists in the novel construction, arrangement and combination of parts that will be hereinafter more fully specified and defined in the appended claims.

In the accompanying drawings constituting part of the specification and in which similar reference characters denote corresponding parts:

Fig. 1 is a diagrammatic view of one embodiment of our invention and

Fig. 2 a similar view of a modification thereof.

Referring to the drawing in detail, let A denote the accelerator pedal, F the brake pedal, B the battery, I the ignition switch, M the fluid pressure master cylinders, P the plunger working therein, and actuated by said brake pedal, $c$, $d$, the conduits leading into the brake cylinders $e$ (only one being shown) and V a valve interposed between said conduits $c$ and $d$ to control the fluid pressure. The valve V is adapted to be actuated electrically by a solenoid E so that on the depression of the brake pedal F, when the solenoid E is not energized, fluid pressure will pass into the brake cylinders and actuate the brakes, and when thereupon the solenoid becomes energized the valve V will be closed trapping the fluid pressure in the brake cylinders and thereby locking the brakes.

The electric means for actuating the solenoid includes a switch 10 adapted to be closed when the accelerator pedal A is released (as shown), a vibration responsive switch $M^1$ and a relay R.

The vibration responsive switch $M^1$ comprises a stationary housing 11 in which is suitably pivotally suspended, as at $12^a$ an open topped receptacle 12 of any suitable shape and insulation material and whose top is hermetically sealed by a plate 13 of conductive material. The receptacle 12 is filled with mercury 14 leaving only an extremely narrow space $14^a$ between its upper surface, and the inner face of said plate 13, so that a slight vibration of the receptacle in any direction will suffice to cause the mercury to come into contact with said plate. Projecting centrally through the bottom of the receptacle 12 and adapted to be submerged in the mercury 14 is a contact member 15. The plate 13 may be grounded as at $13^a$ while the contact member 15 is connected to the relay R as will be presently described.

The relay R is composed of two suitably mounted electromagnets 16, 17, so that their armatures $16^a$, $17^a$ are located centrally opposite and suitably spaced from one another. Pivotally supported on a stationary insulated part 19 of said relay R is a double arm 20 of conducting material whose one arm is under the tension of a spring 18 and whose other arm is formed with a contact point 22. This contact point in cooperation with a contact point 23 fixed to an insulated stationary conductor 24 constitutes a switch 25 normally tending to be closed under the action of spring 18.

The two electromagnets may be made of somewhat different strength, as for instance, the electromagnet 16 when energized may be only so strong as to attract the arm 20 against the tension of spring 18, but not strong enough to attract the arm against the combined pull of both spring and electromagnet 17. Or the spacing between the contact arm 20 and the two electromagnets may be so calculated that a relatively weak pull will suffice to cause the attraction of the arm 20 by the energized electromagnet 16 against the action of spring 18, when the electromagnet 17 is deenergized.

The operation is as follows:

Assuming that the vehicle has been brought to a full stop, with the ignition on, the accelerator pedal A released and the brake pedal F depressed. Then the battery current will flow along wire $a$, ignition switch I, wire $b$ through closed accelerator switch 10, wire $k$, wire $l$ to arm 20, closed switch 25, wires $m$, $n$, to one terminal of the coil of the solenoid and along wire $n^1$ from the other terminal thereof to the ground, and simultaneously a second branch along wire o to one terminal of the coil of the electromagnet 17 and from the other terminal of the latter along wire o¹ to the ground, completing the electric circuit, and thereby energizing the solenoid E with the effect of closing the valve V and locking the brakes as hereinbefore stated. The energized electromagnet 17 through said second branch of the circuit along wires o and o¹ will maintain the switch 25 closed as long as the accelerator pedal A is in released position.

When the vehicle is in motion, the battery circuit through the open switch 10 will be open and hence the solenoid E and the relay 17 deenergized. During that motion there will be vibration of the mercury 14 in the container 12 and as a result thereof the switch 13, 15 closed, so that the battery circuit will flow along line p, by passing the open accelerator switch 10, through the second relay 16 and along line q, and will energize the said relay 16. This will cause its armature to attract the contact lever 20 against the tension of its spring 18.

Now, while the vehicle is moving, the accelerator pedal A is released, as during coasting, or when the vehicle is running on its own momentum, the closing of the switch 10 will not affect the solenoid nor the relay 17, since the switch 25 by the action of the relay 16 has been opened and remains open until the vehicle comes to a full stop. It is therefore clear that during such motion with the accelerator released, the brake pedal can be manipulated in the usual manner without causing the brake becoming accidentally locked.

As there may be times when while the vehicle is in motion, intermittent contact, instead of a constant contact is made, between the mercury and plate 13 of switch M, electromagnet 16 may be provided with a copper heel or other suitable well known means to produce a time delay action for the release of the contact arm 20.

In the modification shown in Fig. 2, the electric means controlling the solenoid E includes in addition to all those means described in the first modification, a switch 26 adapted to be actuated by the transmission shifting mechanism T. This switch 26 is adapted to be closed when the transmission T is in neutral (indicated in full lines). The electric connections between said switch and the relay R are such that when the transmission is in neutral the battery current will bypass the accelerator switch 10, which will permit the operator to depress the accelerator A while the vehicle is at rest, without unlocking the brakes.

The operation is as follows:

When the vehicle is at rest, with the ignition switch I on, and the transmission T in neutral, the electric circuit energizing the solenoid E and locking the brakes, will be completed through wires b, b¹, closed switch 26, wires b², K through the electromagnet 17 and to the solenoid E. When the vehicle is in motion, the mercury switch 13, 14, due to vibration will be closed causing the electromagnet 16 to be energized and the opening of switch 25, all as described in connection with the first modification. By positioning the transmission in neutral, the switch 26 will be closed, so that the battery circuits through electromagnet 17 and solenoid E will be completed through wires b¹, b², k etc. Thus the solenoid E will be energized and remain energized until the shifting of the transmission to speed, which will cause the opening of the circuit. The operator is thus able to depress the accelerator for starting the engine, without causing the unlocking of the brakes.

It is quite obvious that various changes may be made in the construction of our brake control means without departing from the principle of our invention. We, therefore, do not wish to restrict ourselves to the details herein described and shown.

What we claim is:

1. In a motor vehicle having an accelerator, and brake mechanism, means for actuating said brake mechanism including a valve, electric means for controlling said brake actuating means, said electric means including a solenoid adapted when actuated to close said valve and thereby lock the brakes in braking position, an accelerator actuated switch adapted to be closed when the accelerator is released, a relay normally closed, which when closed completes the circuit through said valve actuating solenoid, and electric means including freely-pivotal suspended means responsive to the motion of the vehicle affecting said relay.

2. In a motor vehicle having an accelerator, and brake mechanism, manual means for actuating said brake mechanism, including a brake pedal, a valve, electric means for controlling said valve, said electric means, including a solenoid adapted when actuated to close said valve and thereby lock the brakes in braking position, an accelerator controlled switch adapted to be closed when said accelerator is released, a relay having a normally closed switch which when closed is adapted to complete the circuit through said valve actuating solenoid and electric means for affecting said relay, said electric means including a self-leveling governor responsive to the motion of the vehicle and switch mechanism actuated by said governor.

3. In a motor vehicle according to claim 2, in which said motion responsive switch includes a freely-pivotal suspended open topped mercury filled receptacle capable of self-leveling and being of non-conductive material, a cover therefor of conductive material hermetically sealing said receptacle with narrow spacing above the upper surface of the mercury, a conductor submerged in the mercury forming one terminal of said switch and a second terminal provided on said cover.

4. In a motor vehicle according to claim 1, in which said relay is composed of a pair of electromagnets arranged with their armatures opposite and at relatively narrow spacing from one another, a switch the movable contact member of which is interposed between said pair of electromagnets and which normally is adapted to be closed, one of said electromagnets being adapted to be energized when said vibration responsive switch is closed, and thereby cause the opening of said switch when current to the other electromagnet has been initially interrupted.

5. In a motor vehicle according to claim 4, in which the circuit through said electromagnet controlled by said vibration responsive switch is adapted to bypass the accelerator actuated switch.

6. In a motor vehicle having an accelerator, brakes, a brake pedal, fluid pressure means for actuating said brakes through said pedal, said means including a valve for controlling the fluid pressure on said brakes, electric means adapted to actuate said valve, said electric means including a solenoid which when actuated will close said valve, to lock said brakes in braking position, a switch adapted to be actuated by said accelerator and to be closed when said accelerator is released, a relay normally closed and adapted when closed to complete the electric circuit through said solenoid and to maintain said electric circuit closed as long as said accelerator switch is closed, and a vibration responsive switch adapted to be open when the vehicle is at a standstill and to close under vibrations and thereby, after said electric circuit has initially been interrupted at said accelerator switch, affect the relay so as to maintain the opening of said electric circuit, and said solenoid deenergized.

7. In a motor vehicle according to claim 6, in which said electric means include also a transmission actuated switch adapted to be closed when the transmission is in neutral, said switch being arranged in the electric circuit to bypass said accelerator switch, so that said solenoid will remain energized while the transmission is in neutral and the vehicle at a standstill, after the opening of the accelerator switch.

JOSEPH WEISS.
ABRAHAM WEISS.

REFERENCES CITED

The following references are of record in the file of this patent:

UNITED STATES PATENTS

| Number | Name | Date |
| --- | --- | --- |
| 1,843,966 | Adams | Feb. 9, 1932 |
| 2,262,842 | Goepfrich | Nov. 18, 1941 |
| 2,287,562 | Pennington | June 23, 1941 |
| 2,329,156 | Coffey | Sept. 7, 1943 |
| 2,334,611 | Darling | Nov. 16, 1943 |
| 2,345,280 | Morgan | Mar. 28, 1944 |
| 2,414,409 | Goepfrich | Jan. 14, 1947 |
| 2,478,884 | Wiseley | Aug. 9, 1949 |